US008239558B2

(12) United States Patent
Setlur et al.

(10) Patent No.: US 8,239,558 B2
(45) Date of Patent: Aug. 7, 2012

(54) TRANSPORT MECHANISMS FOR DYNAMIC RICH MEDIA SCENES

(75) Inventors: Vidya Setlur, Irving, TX (US); Daidi Zhong, Tampere (FI); Miska Hannuksela, Ruutana (FI); Ramakrishna Vedantham, Irving, TX (US); Suresh Chitturi, Irving, TX (US); Tolga Capin, Fort Worth, TX (US); Michael Ingrassia, San Jose, CA (US)

(73) Assignee: Core Wireless Licensing, S.A.R.L., Luxembourg (LU)

( * ) Notice: Subject to any disclaimer, the term of this patent is extended or adjusted under 35 U.S.C. 154(b) by 818 days.

(21) Appl. No.: 11/474,816

(22) Filed: Jun. 26, 2006

(65) Prior Publication Data

US 2007/0157283 A1 Jul. 5, 2007

Related U.S. Application Data

(60) Provisional application No. 60/694,440, filed on Jun. 27, 2005.

(51) Int. Cl.
*G06F 15/16* (2006.01)
(52) U.S. Cl. ...................................................... 709/231
(58) Field of Classification Search .................... 709/231
See application file for complete search history.

(56) References Cited

U.S. PATENT DOCUMENTS

| 6,735,634 | B1 * | 5/2004 | Geagan et al. ............... 709/235 |
| 7,246,318 | B2 * | 7/2007 | Debique et al. ............... 715/734 |
| 7,366,241 | B2 * | 4/2008 | Matsui ....................... 375/240.27 |
| 2002/0141740 | A1 * | 10/2002 | Matsui ............................ 386/111 |
| 2004/0028049 | A1 * | 2/2004 | Wan ............................... 370/394 |
| 2004/0174875 | A1 * | 9/2004 | Geagan et al. ................ 370/389 |
| 2004/0181666 | A1 * | 9/2004 | Candelore ..................... 713/160 |
| 2004/0230560 | A1 | 11/2004 | Elza |
| 2005/0141484 | A1 * | 6/2005 | Rasanen ....................... 370/352 |
| 2005/0188413 | A1 * | 8/2005 | Mohammed et al. ......... 725/112 |
| 2005/0223098 | A1 | 10/2005 | Rimac et al. |

FOREIGN PATENT DOCUMENTS

| EP | 1239646 | 9/2002 |
| WO | WO 0205089 | 1/2002 |
| WO | WO 03052626 | 6/2003 |
| WO | WO 03052626 A1 | 6/2003 |

OTHER PUBLICATIONS

Schulzrinne, H. et al. "Audio-Video Transport Working Group", RFC 1889. Jan. 1996.*
Flute—File Delivery Over Unidirectional Transport, Network Working Group, T. Paila, Oct. 2004, 68 pages.
SDP: Session Description Protocol, Network Working Group, Handley et al., Apr. 1998, 82 pages.

(Continued)

*Primary Examiner* — Kenny Lin
*Assistant Examiner* — Saad A Waqas
(74) *Attorney, Agent, or Firm* — AlbertDhand LLP (57) ABSTRACT

A transport mechanism for supporting the download of SVG over FLUTE or UDP. A RTP payload format is specified that enables live streaming and the streaming of rich media content. According to the present invention, rich media content is encapsulated in RTP packets based upon the payload format at the sender. With the present invention, an efficient framework is provided for satisfying several use cases or scenarios that involve rich media transmission.

28 Claims, 6 Drawing Sheets

```
                    0                   1                   2                   3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |V=2|P|X|  CC   |M|     PT      |         sequence number        |
  +-+-+-+-+-+-+-+-+-+-+-+-+-+-+-+-+-+-+-+-+-+-+-+-+-+-+-+-+-+-+-+-+
  |                           timestamp                           |
  +-+-+-+-+-+-+-+-+-+-+-+-+-+-+-+-+-+-+-+-+-+-+-+-+-+-+-+-+-+-+-+-+
  |           synchronization source (SSRC) identifier            |
  +-+-+-+-+-+-+-+-+-+-+-+-+-+-+-+-+-+-+-+-+-+-+-+-+-+-+-+-+-+-+-+-+
  |            contribution source (SSRC) identifiers             |
  |                            ........                           |
 /+-+-+-+-+-+-+-+-+-+-+-+-+-+-+-+-+-+-+-+-+-+-+-+-+-+-+-+-+-+-+-+-+
 | |TYPE |  R  | PR|   CTR   |       <--fixed header fields
 | +-+-+-+-+-+-+-+-+-+-+-+-+-+-+-+-+
 | | PAD | GRP |    SDID     |L| SIM |S| <--variable header fields and flags
depending on TYPE
U | +-+-+-+-+-+-+-+-+-+-+-+-+-+-+-+-+-+-+-+-+-+-+-+-+-+-+-+-+-+-+-+-+
N |  :                                                            :
I <  :                                                            :
T |  :                        SVG SAMPLE CONTENTS                 :
  |  :                                                            :
  | |
  \ \+-+-+-+-+-+-+-+-+-+-+-+-+-+-+-+-+-+-+-+-+-+-+-+-+-+-+-+-+-+-+-+/
```

OTHER PUBLICATIONS

Paila et al., Flute-File delivery over unidirectional transport. Internet draft, 040605. Retrieved from internet: URL:http://www.faqs.org/ftp/pub/pub/internet-drafts/draft-ietf-rmt-flute-08.txt, Retrieved 061120.

International Search Report for PCT/IB2006/001751.

Office Action for Chinese Patent Application No. 200680030021.1, dated Oct. 9, 2010.

English translation of Office Action for Chinese Patent Application No. 200680030021.1, dated Oct. 9, 2010.

* cited by examiner

TRANSPORT MECHANISMS FOR DYNAMIC RICH MEDIA SCENES

FIELD OF THE INVENTION

This present invention relates to transport mechanisms for streaming and downloading rich media content. More particularly, the present invention relates to transport mechanisms for streaming and downloading rich media content containing Scalable Vector Graphics (SVG) over point-to-point and broadcast/multicast services.

BACKGROUND OF THE INVENTION

SVG is a useful format for media presentations. SVG can provide a layout within which other media can be embedded and played, for real-time stock and traffic information, and for entertainment purposes. In recent years, Mobile Scalable Vector Graphics (Mobile SVG), has been adopted as the new imaging standard by the Third Generation Partnership Project (3GPP) for playing a pivotal role in bringing improved graphics and images to mobile devices.

Recently, 3GPP and the Open Mobile Alliance (OMA) have begun work on the streaming of rich media over Portable and Simple Syndication (PSS) and Multimedia Broadcast/Multicast Service (MBMS). This requires the ability to combine both raster and vector graphics with existing audio, video, and timed text media. However, unlike existing frame-based media, SVG follows for declarative animation with a specified presentation start time and duration. All the different tracks in the rich media need to be temporally synchronized and streamed via real-time transport protocol (RTP) packets using the track information contained within the ISO Base Media File Format. Currently, the RTP payload specifications cater to the packetization of frame-based media and results in synchronization problems among frame-based and non-frame based SVG.

Currently, SVG and other media can only be downloaded and progressively downloaded via HTTP. There is currently no mechanism for permitting the download of SVG over FLUTE, which is a Cascading Style Sheets, Level 2 (CSS2) parser written in Java that implements SAC. SAC is an event-based application program interface (API) for CSS parsers.

Additionally, due to the lack of an appropriate RTP payload format, there is currently no available mechanism for streaming SVG contents either out of ISO base media files or directly from live content.

Previously, there has been work on transport mechanisms for media formats such as audio, video and timed text. Macromedia Flash, a proprietary format for vector graphics, does not have support for real time (RTSP/RTP) streaming. Instead, Flash only uses progressive downloading from a web server or http streaming via the Flash Communication Server which only runs in a Windows environment.

SUMMARY OF THE INVENTION

The present invention provides for a transport mechanism for supporting the download of SVG over FLUTE or the User Datagram Protocol (UDP). The present invention also provides a specification of an RTP payload format that enables live streaming and the streaming of rich media content. As used herein, "live streaming" refers to media streams from a live encoder. According to the present invention, rich media content is encapsulated in RTP packets based upon the payload format at the sender.

The present invention provides for an efficient framework for satisfying several use cases or scenarios that involve rich media transmission.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE INVENTION

SVGT version 1.2 supports prefetching for progressive downloading. However, for real-time streaming, a scene may change through animations and changes in scene states. This sequence of scene description and its spatial/temporal modifications needs to be streamed from the server to the players on the client device.

Logical scenes in SVG animations are grouped together using the <g> element. The SVGT 1.2 specification suggests that, for the case of progressive downloading and streaming, all scene definitions must be children of the root <svg> element in the DOM tree. Each adjacent top level <g> element should contain adjacent chronological scenes in the animation.

Scene updates are incremental updates to the SVG DOM that get sent to the client device one at a time. These updates include SVG element addition, element deletion, element replacement and element attribute update.

SVG supports media elements similar to Synchronized Multimedia Integration Language (SMIL) media elements. Dynamic or real time media elements define their own timelines within their time container. All SVG media elements support the SVG timing attributes and run time synchronization. The real time media elements are audio and video, and are embedded as follows in SVG:

<audio xlink:href="1.ogg" volume="0.7" type="audio/vorbis" begin="mybutton.click" repeatCount="3" />
<video xlink:href="ski.avi" volume=".8" type="video/x-msvideo" x="10" y="170"/>

Furthermore, SVG can also embed other SVG documents, which in turn can embed yet more SVG documents through nesting. The embedded media elements can be linked through internal or external URLs in the SVG content.

The animation element specifies an external embedded SVG document or an SVG document fragment providing synchronized animated vector graphics. Like the video element, the animation element is a graphical object with size determined by its x, y, width and height attributes. For example:

```
<animation begin="1" dur="3" repeatCount="1.5" fill="freeze" x="100" y="100"
xlink:href="myIcon.svg"/>
```

On the other hand, static media such as images are embedded in SVG using the 'image' element, such as:

```
<image x="200" y="200" width="100px" height="100px"
    xlink:href="myimage.png">
```

Figure 1:
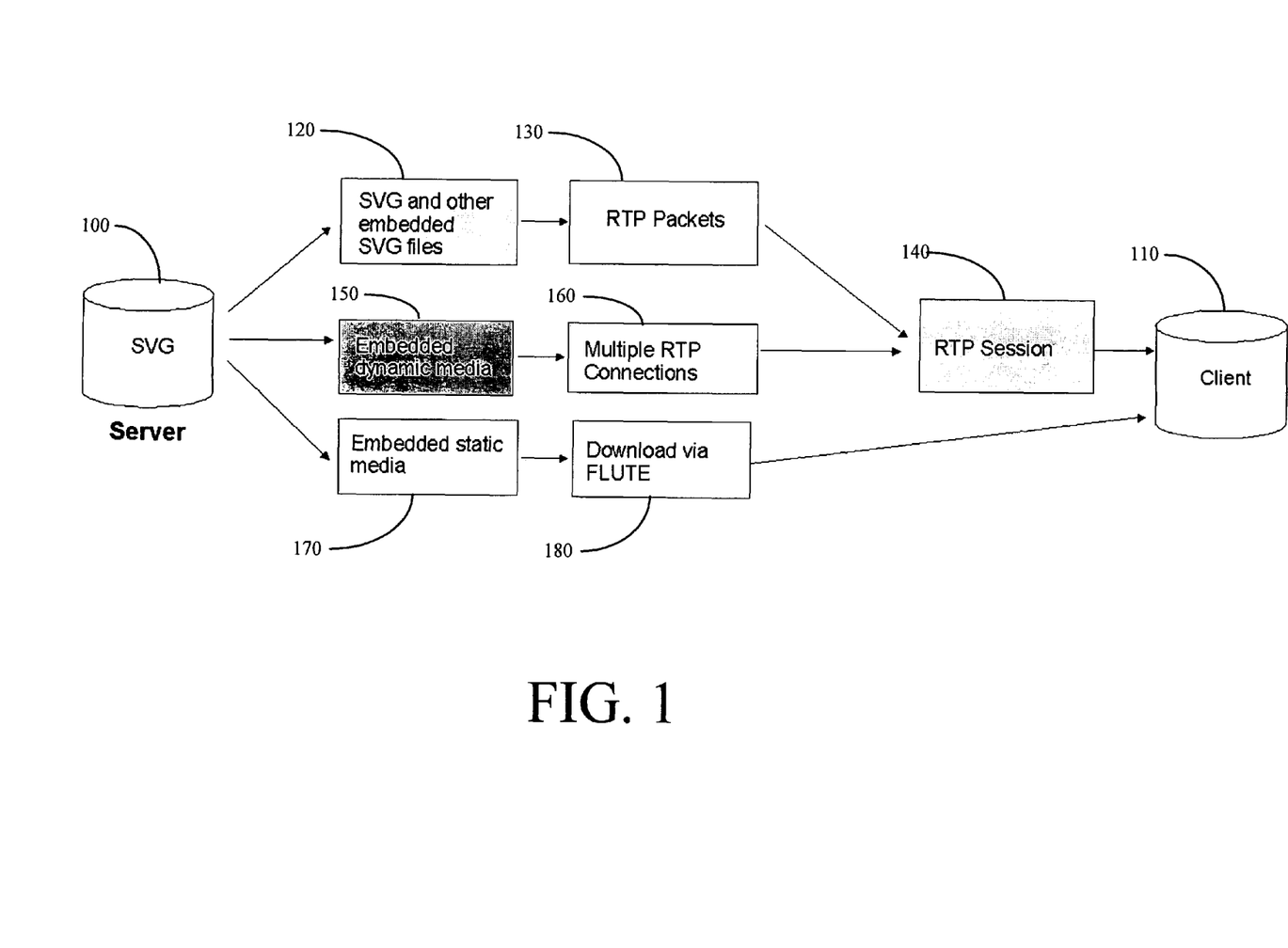
FIG. 1 is a depiction of an SVG transport mechanism in accordance with the present invention.

An overview of the transport mechanism of the present invention is depicted in FIG. 1. As shown in FIG. 1, SVG is transported from a server 100 to a client device 110 by dividing the content into three separate groups. SVG and other embedded SVG files, which are represented at 120, are transported in RTP packets 130, and an RTP session 140 transports the information to the client device 110. Embedded dynamic media 150 use multiple RTP connections 160. An RTP session 140 is also used to transport the embedded dynamic media 150 to the client device 110. Embedded static media, represented at step 170, are downloaded by the client device 110 via FLUTE at 180.

A first implementation of the present invention involves using the RTP payload format to enable rich media streaming. In this implementation, the RTP units are classified as follows. A TYPE1 packet contains one or more than one sample description. A TYPE2 packet contains a complete SVG scene sample or one of its fragments. A TYPE3 packet contains a complete SVG scene update sample or one of its fragments. A TYPE4 packet contains a list of SVG elements that are currently active. A TYPE5 packet contains sample dissimilarity information.

Figures 2, 3:
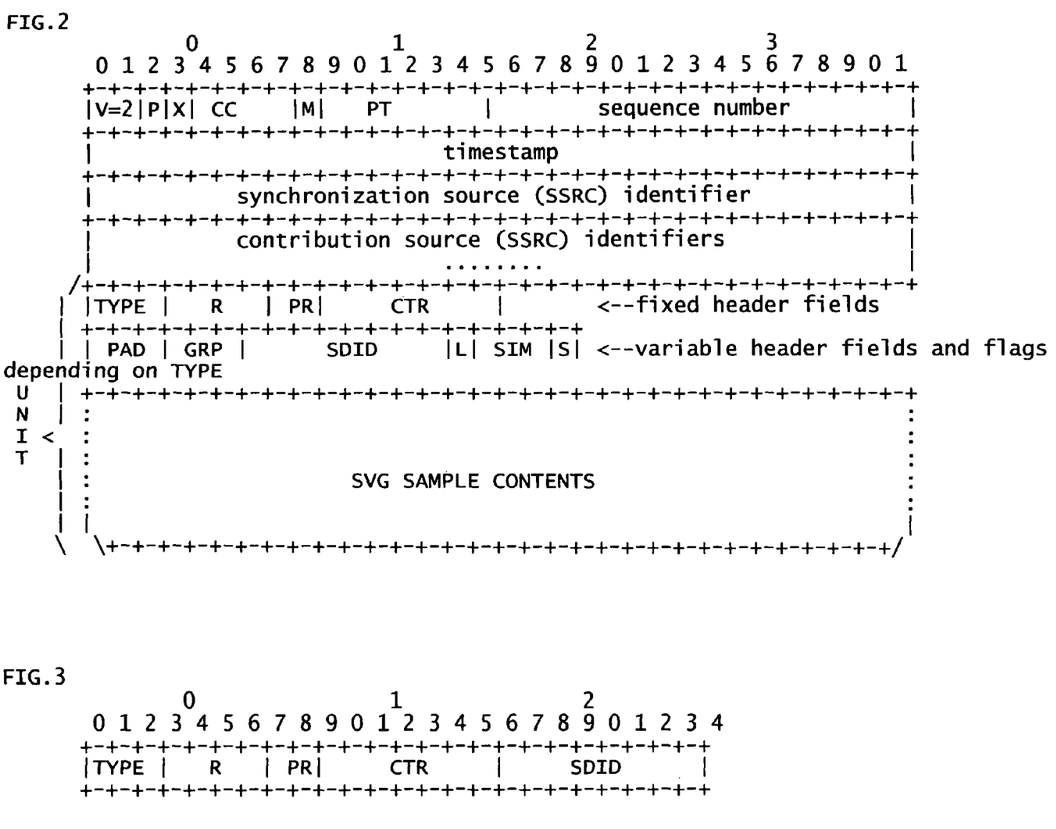
FIG. 2 is a depiction of the format of the RTP payload fields in the transport mechanism of the present invention.
FIG. 3 is a depiction of the RTP payload header for TYPE1 packets.

The duration of an SVG scene is specified within the SVG format itself. The format of an RTP packet containing SVG is shown in FIG. 2. The market bit M (1 bit) indicates whether the current packet contains the final fragment, if any, of an SVG sample. For TYPE1 packets, assuming the rule that the sample description cannot be fragmented, the M bit is always set to 1. For TYPE2, TYPE3, TYPE4 and TYPE5 packets, the M bit is set to 1 if it is either a complete sample or the final fragment of the sample. Otherwise, the M bit is set to 0. Whenever the client device 110 receives an RTP packet 130 with the M bit set to 1, it regards the transmission for the current sample as completed and starts to do the next step (FEC checking and decoding).

The timestamp indicates the sampling instant of the SVG sample. For TYPE1 packets, the timestamp is set equal to the timestamp of the following packet. The client device 110 should ignore the timestamp for this case. It should be noted that a setting of zero would break any logic that the RTP client may have based on inter-arrival jitter calculation. A typical way to assign a timestamp for packets that do not have an inherent time property is to associate the packet to the preceding or succeeding packet and copy its timestamp. For TYPE2 and TYPE3 packets, the timestamp indicates the sampling instant of the current SVG sample. For TYPE4 packets, since the list is sent once for a particular group of scenes and scene updates, the timestamp for TYPE4 is within the start (the timestamp of first sample in the group) and the end (the timestamp of last sample in the group) times of the group. For TYPE5 packets, since the sample dissimilarity information shows the difference between the current and previous scene graphs, the timestamp of the TYPE5 packet must be the same as the current sample.

For live streaming, an appropriate timestamp clock rate is used. This value should provide enough timing resolution for synchronizing SVG with other media. Unlike other media such as audio and video, there is no default sample size or sampling rate defined for SVG. The encoding application must take into account the delay constraints of the real-time session and assess whether FEC, retransmission or other similar techniques are reasonable options for stream repair.

The usage of the remaining RTP header fields follows the rules of RFC 3550, which can be found at www.faqs.org/rfcs/rfc3550.html, and the profile in use. It should be noted that multiple fragments belonging to the same sample are identified by both the 'timestamp' and 'TYPE.'

The payload headers comprise a set of common fields followed by specific fields for each header type and sample contents. The fields common to all payload headers have the following format. The "Type Field" (3 bits) specifies which specific header fields follow. The following TYPE values are defined:

The RTP units are classified as follows. A TYPE1 packet contains one or more than one sample description. A TYPE2 packet contains a complete SVG scene sample or one of its fragments. A TYPE3 packet contains a complete SVG scene update sample or one of its fragments. A TYPE4 packet contains a list of SVG elements that are currently active. A TYPE5 packet contains sample dissimilarity information.

The "Reserved Bits Field" (R-4 bits) is used for future extensions. This field must be set to zero (0×0) and is ignored by receivers.

The "Priority Field" (PR-2 bits) indicates the level of importance for a particular sample. A higher value indicates a higher priority. For example, in circumstances where data is transmitted through a media gateway, more important packets are sent through a reliable channel, while less important packets are sent through a less reliable channel or are simply discarded. Additionally, such a priority mechanism allows the encoder to apply partial FEC protection. Furthermore, with such a priority system, the sender can duplicate the more important packets in case of packet loss. This flag is present in all five of the packet types.

The "Counters Field" (CTR-7 bits) is tied with the PR flag. Each of the four individual counters is incremented by one for each new packet of the corresponding priority. The CTR field is warped to zero after reaching the maximum limit. A discontinuation in the sequence number indicates a lost packet. A discontinuation in the counter value (of a certain priority) indicates the priority of a lost packet. This phenomenon is depicted in Table 1 below.

TABLE 1

| | Seq. No. | | | | | | | | | | | | | | |
|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 |
| TYPE | 1 | 1 | 4 | 4 | 3 | 3 | 3 | 4 | 4 | 5 | 3 | 3 | 3 | 1 | 2 |
| PR | 3 | 2 | 3 | 3 | 2 | 2 | 0 | 1 | 1 | 2 | 2 | 1 | 2 | 1 | 3 |
| CTR3 | 1 | | | 2 | 3 | | | | | | | | | | 4 |
| CTR2 | | 1 | | | | 2 | 3 | | | | 4 | 5 | | 6 | |
| CTR1 | | | | | | | | 1 | 2 | | | | 3 | | 4 |
| CTR0 | | | | | | | 1 | | | | | | | | |
| CTR | 1 | 1 | 2 | 3 | 2 | 3 | 1 | 1 | 2 | 4 | 5 | 3 | 6 | 4 | 3 |

The following sections specify the different payload headers for the TYPE values. TYPE1 headers, depicted in FIG. 3, are used to transport sample descriptions (both static and dynamic). The RTP transmission always starts with one or more than one TYPE1 packet containing static sample descriptions, including the one for the first TYPE2 packet. The TYPE R, PR and CTR fields are used as above, followed by the sample descriptions. Each sample description contains the following four fields in order: SDID |content encoding |text encoding |content script type.

The "Sample Description Index Field" (SDID-8 bits) is an index used to identify the sample descriptions (SD) to help decode the payload. There are two types of SDID: static and dynamic. The static and dynamic SDs use them respectively. The static sample description remains active during the whole presentation, while the dynamic sample description remains active until the next scene sample is presented. The static and dynamic sample descriptions can be distinguished by their associated SDID values. Both the static and dynamic sample description cannot be modified during their active periods. Both sample descriptions are transmitted in TYPE1 packets. The static SDID is used to identify static sample descriptions. The dynamic SDID is used to identify dynamic SDs. Larger values are assigned to the dynamic SDID, while lower values are assigned to the static SDID. For example, 0-63 are assigned to static SDIDs; 64-255 are assigned to dynamic SDIDs. This assignment threshold is transmitted out-of-band in the Session Description Protocol (SDP) before RTP transmission. By default, the first 64 SDIDs are assigned to being static, while the rest is assigned to be dynamic. However, this assignment can vary depending on the server, network conditions, number of sample descriptions, length of sample descriptions, etc.

The SDID's are connective integers, as discussed in the following example. The allowed value range of static SDIDs is from 0 to 63. In other words, the maximum number of allowed static Sample Descriptions is 64. It is not necessary for them to start from 0, but they must be connective. The allowed value range of dynamic SDIDs is from 64 to 255. During each active period, the maximum number of allowed dynamic sample descriptions is 192. It is not necessary for them to start from 64, but they must be connective.

The length of the version-profile, text-encoding-type and compression-type are 16, 8 and 8 bits, respectively. The "content encoding" field is a null terminated string with possible values being 'none', 'bin_xml', 'gzip', 'compress' and 'deflate'. This is specified according to www.w3.org/Protocols/rfc2616/rfc2616-sec3.html#3.5. The 'text encoding' field is a null terminated string with possible values selected from the 'name' or 'alias' fields (depending upon the application) in the IANA specifications (which can be found at www.iana.org/assignments/character-sets) such as US-ASCII, BS 4730, etc.

The "content script type" (CSCR) field identifies the default scripting language for the given sample. This attribute sets the default scripting language for all of the instances of script in the document. The value content type specifies a media type. If scripting is not enabled, then the value for this field is 0. The default value is "ecmascript" with a value of 1.

Figure 4:
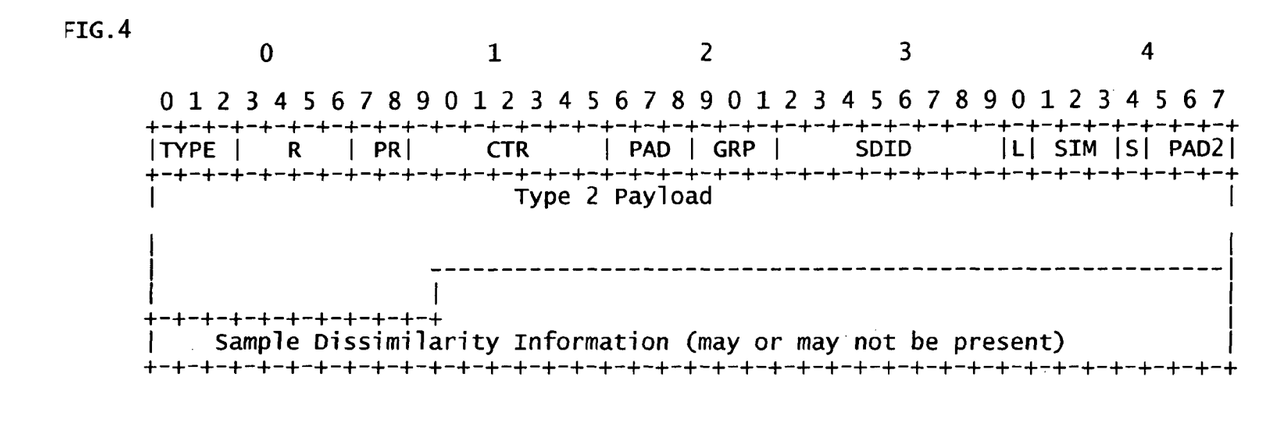
FIG. 4 is a depiction of the RTP payload header for TYPE2 packets.

A TYPE2 header, depicted in FIG. 4, is used to transport complete SVG scene samples. This unit is used in the case when the SVG sample is small enough to be transported in one unit without having to make smaller scene fragments. The TYPE, PD, SDID and R fields have similar interpretation as in TYPE 1.

The "Number of Padding Bits Field" (PAD—3 bits) indicates how many padding bits are in the final octet of the real payload.

The GRP field (4 bits) indicates to which group the scene belongs. Generally, one scene followed by one or more scene updates constitutes a group. However, the grouping nature is flexible and can be determined at the authoring level. Grouping allows a current list of active elements (TYPE4) to be sent once per group, and allows for more efficient error correction mechanisms.

The Sample Description Index Field (SDID) contains a reference to the sample description that must be used to parse the scene description contained in the particular payload.

The LNK flag (L—1 bit) indicates whether the current SVG sample contains an audio, video, animation or image tag, indicating that the SVG references external audio, video, SVG or image content. This field can help the client device 110 decide the decoding order and prepare for new transmissions of external media content.

The SIM field (3 bits) is used to denote if Sample Dissimilarity Information (SDI) is present or not. SDI provides information as to how a sample is different from the scene graph currently on the client. This information can either compare two scenes or two scene graphs (i.e., scenes with scene updates). The choice depends upon the nature of the server as well as how the client can handle such information.

The SIM field has several values. SIM=000 if the current packet does not contain any SDI. SIM=001 if the next sample and the sample in the current packet are identical. SIM=010 if the next sample is an empty SVG sample. SIM=011 if the two samples are different, and the SDI is appended at the end of current packet. This occurs when the length of the SDI is small enough to be appended. TYPES2-5 support appending the SDI. SIM=100 if the two samples are different, and the SDI is sent in TYPE 7 or TYPE 9 packets when the length of the SDI is long.

The S flag (1 bit) indicates whether the current packet contains the starting point of the current sample. While the M flag indicates the ending point of a current sample, the S flag indicates the starting point. The combination of the M and S flags provide the following information. When M=1 and S=1, the current packet contains a complete sample. When M=0 and S=1, the current packet contains the first fragment of a sample. When M=1 and S=0, the current packet contains a final fragment of the sample. When M=0 and S=0, the current packet contains a middle fragment of a sample. In these situations, "sample" refers to an SVG scene, scene update, SDI or an active list of SVG elements.

Figure 5:
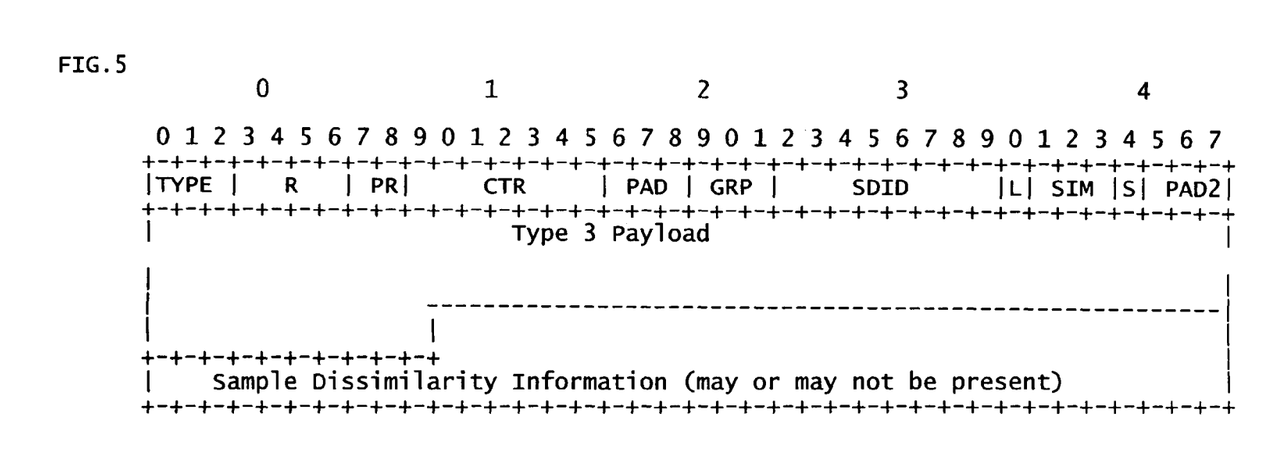
FIG. 5 is a depiction of the RTP payload header for TYPE3 packets.

A TYPE3 header is used to transport whole SVG scene update samples. This unit is used in the case when the SVG scene update is small enough to be transported in one unit without having to fragment into smaller samples. All of the fields have similar interpretations as in TYPE2 headers. A scene update contains information for adding, deleting, and replacing elements and their attributes in the current scene.

Figure 6:
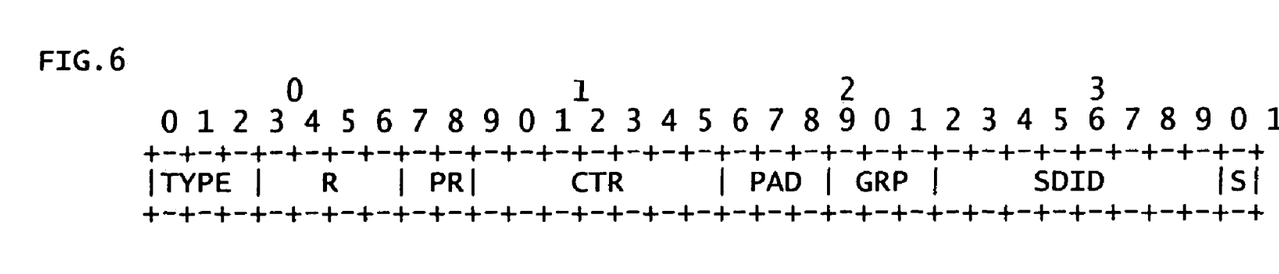
FIG. 6 is a depiction of the RTP payload header for TYPE4 packets.

The TYPE4 header contains definitions of currently active SVG elements in the scene graph at that particular time stamp. This allows the client to better manage elements and memory. All of the fields have similar interpretations as the other types. The GRP field allows TYPE4 packets to be transmitted only once per group for optimization. When to transmit TYPE4 packets in the group (whether at the beginning, middle or end) is determined by the server 100 or by any special instructions accompanying the SVG content. The interpretation of the fields is the same as in the other TYPE headers. An SVG definitions block containing currently active SVG elements is present in this TYPE. This allows the client to check its SVG scene graph to make sure that it contains all the SVG elements that are currently active. With the introduction of this TYPE4 format, errors in the scene graph due to packet loss may be corrected. In the SVG specification, a <defs>...</defs> block contains the SVG element list.

Figure 7:
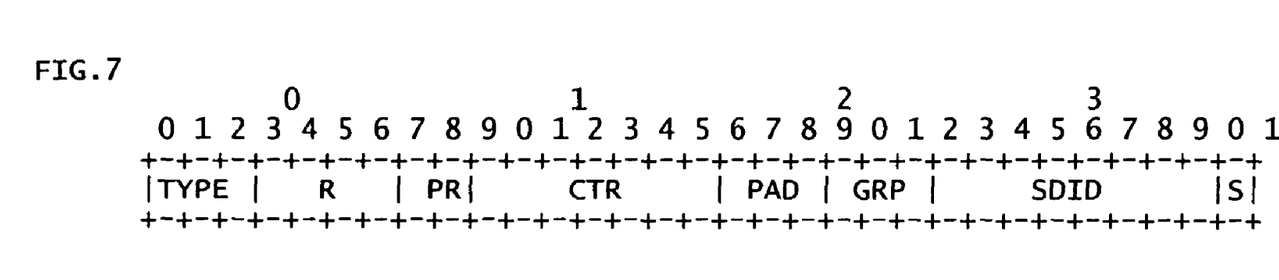
FIG. 7 is a depiction of the RTP payload header for TYPE5 packets.

The TYPE5 header contains the SDI, in the event that it is too long to be appended to TYPES2 and 3 headers. The interpretation of all the fields is the same as in the other TYPE headers.

A second implementation of the present invention involves the transmission of dynamically embedded media. In this implementation, SDP information is provided only for internally embedded dynamic media, while the receiver can request externally embedded dynamic media from the external streaming server. One clock rate must be specified in the SDP for the whole SVG presentation. The resolution of the clock must be sufficient for the desired synchronization accuracy and for measuring packet arrival jitter. The clock rate of the embedded dynamic media files within the presentation needs to be considered. For example, if the presentation contains embedded video, the suggested clock will be no less than 90,000.

Multiple RTP connections within one session are used to transmit the dynamic embedded media. It is the responsibility of the encoder to calculate the time stamp when generating the RTP packets in order to ensure proper synchronization. The start-time of each sample needs to be mapped to the time stamp of the RTP packets.

Only the source locations of internally embedded dynamic media are indicated in SDP. The embedded media may come from a track in the main file, an internally embedded file in the same directory, or an item from a 3GPP file in the same directory. There are four ways to indicate these locations:
1. file_name="video2.h263"
2. box=-moov;track_ID=1
3. item_ID=3
4. item_name="video4.h263"

In this situation, the 'item_ID' and 'item_name' are the associated information for the embedded item, which is saved in ItemLocationBox and ItemInfoBox, respectively, in a 3GPP file.

The SDP session specifies the SVG format, its clock rate and the SDID threshold. An example of a media-level description in SDP is shown below. In this case, four H.263 vedio media with the same format are embedded in the presentation. Each ("a=fmtp", "a=-rtpmap") pair describes one source location.

```
m=svg+xml 12345 RTP/AVP 96
a=rtpmap:96 X-SVG+XML/100000
a=fmtp:96 sdid-threshold=63;version_profile="1.2";base_profile="1"
m=video 49234 RTP/AVP 98 99 100 101
a=rtpmap:98 h263-2000/90000
a=fmtp:98 box=moov;track_ID="1";profile="3";level="10"
a=rtpmap:99 h263-2000/90000
a=fmtp:99 file_name="video2.h263";profile="3";level="10"
a=rtpmap:100 h263-2000/90000
a=fmtp: 100 item_ID="3";profile="3";level="10"
a=rtpmap:101 h263-2000/90000
a=fmtp:101 item_name= "video4.h263";profile="3";level="10"
```

There is no need to specify the source location of the main SVG file. However, if there is an embedded SVG file or content in the main SVG file, then the source location of the file or content should be specified in SDP as an individual media-level SDP description.

A third implementation of the present invention involves the transmission of static embedded media. The static embedded media files (e.g. images) can be transmitted by either (1) sending them to the UE in advance via a FLUTE session; (2) sending the static media to each client on a point-to-point bearer before the streaming session, in a manner similar to the way security keys are sent to clients prior to an MBMS session; (3) having a parallel FLUTE transmission session independent of the RTP transmission session, if enough radio resources are available, or (4) having only one transmission session to transmit all of the data due to the limited radio resources. Such a transmission has data from two user sessions—one for RTP and the other for FLUTE.

Options (1) and (2) above can be implemented at the SVG group level (comprising a group of scenes and scene updates), rather than at the presentation level. Therefore, immediately before the group is transmitted, the embedded static files can be sent in a separate FLUTE session.

The SDP information is provided for only internally embedded static media or SVG content. For a FLUTE session, the receiver may explicitly download the externally embedded static media or SVG content from the server. The URLs of the internally embedded media are indicated in the file delivery table (FDT) field inside of the FLUTE session, rather than in SDP. The syntax of the SDP description for FLUTE has been defined in the Internet-Draft: SDP Descriptors for FLUTE (www.ietf.org/internet-drafts/draft-mehta-rmt-flute-sdp-02.txt).

The following are other alternative implementations for the present invention.

Implementation 4: Same as implementation-1 but with the fields re-ordered.

Implementation 5: The first implementation discussed above specifies the minimum possible size for the fields in the payload header format. Certain fields can be longer than the specified values.

Implementation 6: In this implementation, PtM is 3GPP MBMS; PtM is 3GPP2 BCMCS; PtM is DVB-H IPDC; and PtM is OMA BCAST.

Implementation 7: Scene dissimilarity information could provide differences across scenes, scene updates and/or scene graphs, a combination of one or more scenes and scene updates.

Implementation 8: The frequency of transmission of a current active list of SVG elements could be either for a group of scenes and scene updates, for only each scene, or at a predetermined time interval. This choice is at the discretion of the server, authoring environment and/or available bandwidth.

Implementation 9: The RTP payload format for rich media could be applied to pre-authored/pre-recorded content, as well as to live content.

Implementation 10: The SDP information for the FLUTE session can have flexible default values for parameters such as clock rate and the SDID threshold.

Figure 8:
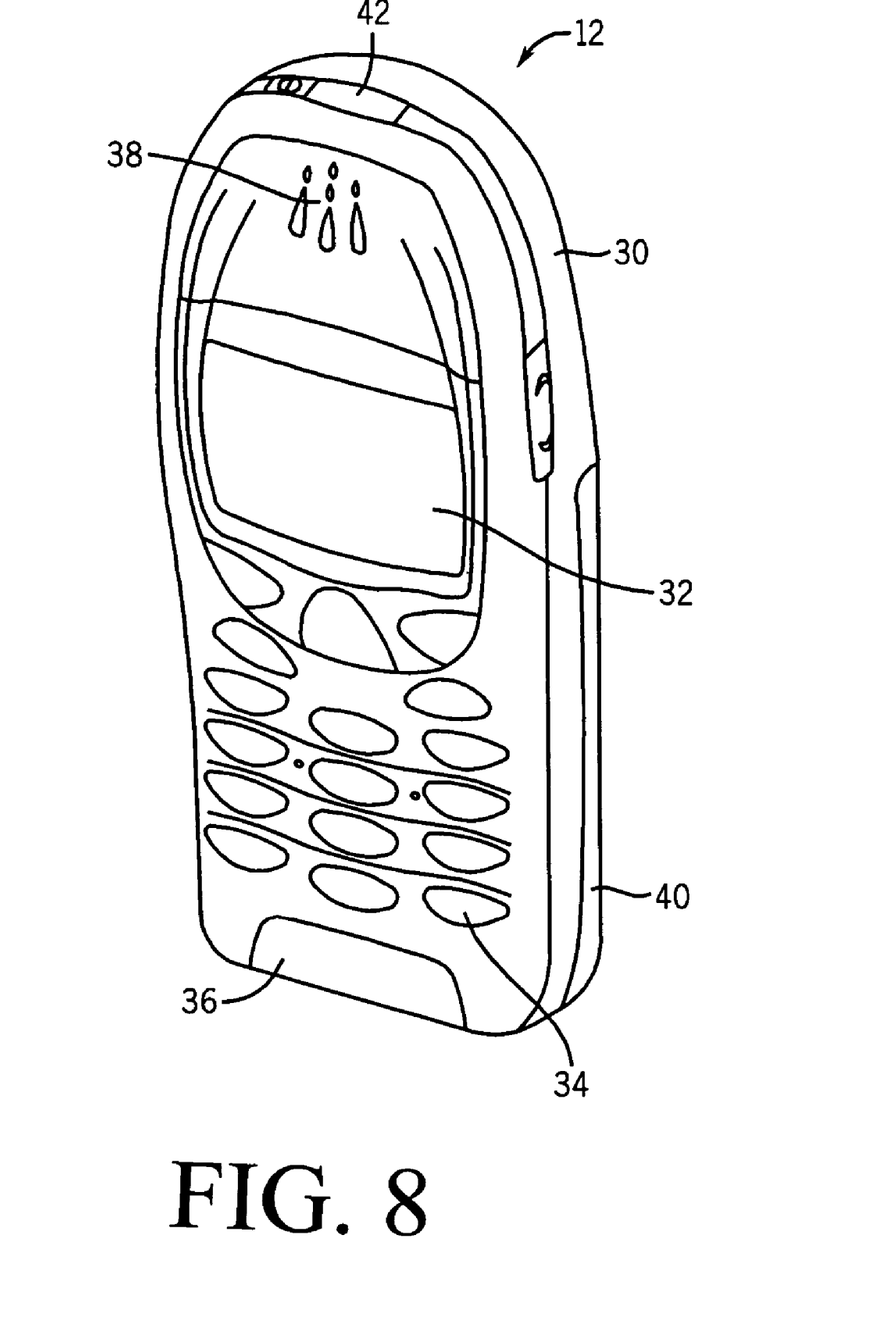
FIG. 8 is a perspective view of a mobile telephone that can be used in the implementation of the present invention.
Figure 9:
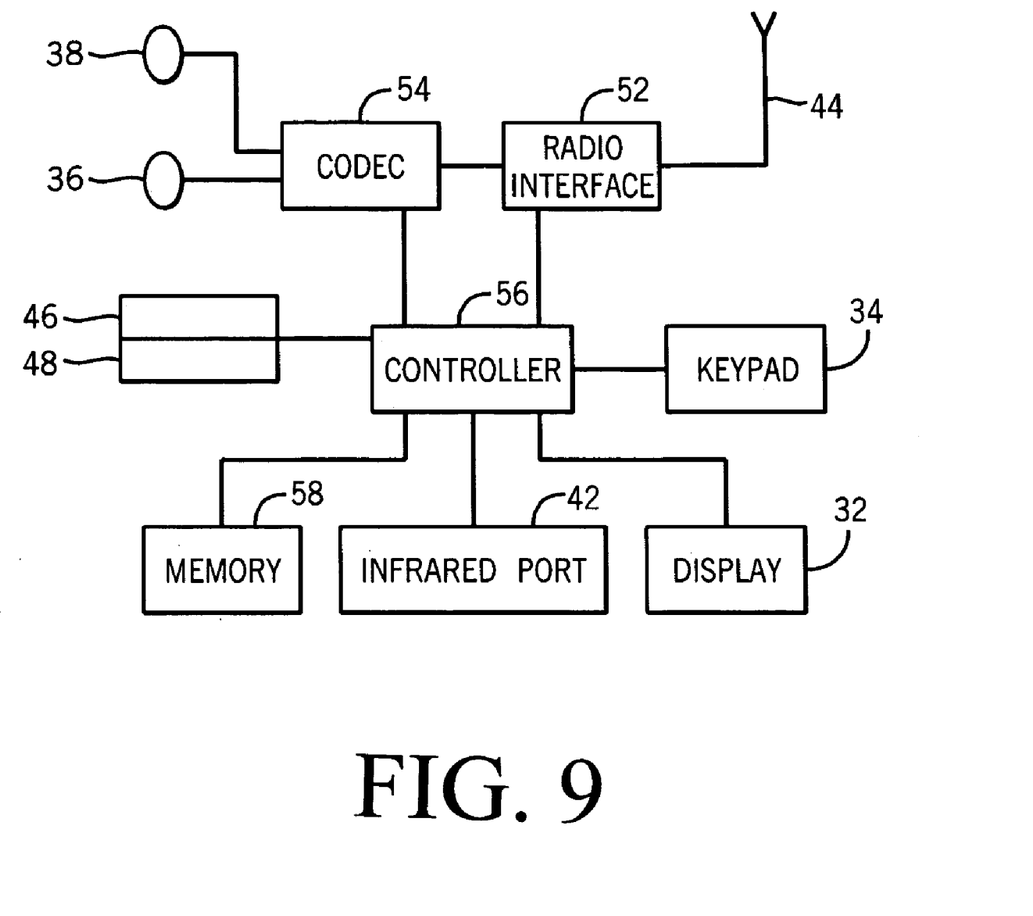
FIG. 9 is a schematic representation of the telephone circuitry of the mobile telephone of FIG. 8.

FIGS. 8 and 9 show one representative mobile telephone 12 for which the present invention may be implemented. This mobile telephone 12 can serve as a client terminal or a server depending upon the particular system at issue. It should be understood, however, that the present invention is not intended to be limited to one particular type of mobile telephone 12 or other electronic device. The mobile telephone 12 of FIGS. 8 and 9 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

Software and web implementations of the present invention could be accomplished with standard programming techniques, with rule based logic, and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for delivering content to a client device, comprising:
    transmitting a signal to the client device, the signal carrying within a packet stream a multimedia presentation specified using a markup language,
    wherein the multimedia presentation includes at least one scene description and at least one scene update, and wherein the packet stream includes scene packets, each of which contains information derived from either one of the at least one scene description or one of the at least one scene update,
    wherein a header for each packet indicates a type of information contained in the packet, the type of information corresponding to at least one of the following categories of content:
    a) sample description;
    b) a fragment of or a complete scene sample;
    c) a fragment of or a complete scene update sample;
    d) a list of elements that are currently active; or
    e) sample dissimilarity information.

2. The method of claim 1, wherein each scene packet includes priority information for the content contained within the scene packet.

3. The method of claim 2, wherein each scene packet includes sequence information relative to the priority information for the scene packet.

4. The method of claim 1, wherein the multimedia presentation includes SVG.

5. The method of claim 1, wherein the packet stream comprises a plurality of real time transfer protocol packets.

6. The method of claim 1, further comprising transmitting embedded static media outside of the packet stream.

7. The method of claim 6, wherein the embedded static media is transmitted via FLUTE.

8. The method of claim 6, further comprising transmitting embedded dynamic media through a plurality of real time transport protocol connections.

9. The method of claim 1, wherein each scene packet includes a type field indicative of the content of the scene packet.

10. The method of claim 1, wherein each scene packet includes a marker bit indicative of whether the scene packet contains a final fragment of an SVG sample within the scene packet.

11. The method of claim 1, wherein each scene packet includes a timestamp indicative of the sampling instant of an SVG sample within the scene packet.

12. The method of claim 1, wherein each scene packet includes a "number of padding bits field" indicative of the number of padding bits that exist in a final octet of the scene packet's content.

13. The method of claim 1, wherein each scene packet includes a "sample description index field" indicative of whether the scene packet's content is static or dynamic.

14. A non-transitory computer readable medium encoded with a computer program product for delivering content to a client device, the computer program product comprising:
    computer code for transmitting a signal to the client device, the signal carrying in a packet stream a multimedia presentation specified using a markup language,
    wherein the multimedia presentation includes at least one scene description and at least one scene update, and wherein the packet stream includes scene packets, each of which contains information derived from either one of the at least one scene description or one of the at least one scene update,
    wherein a header for each packet indicates a type of information contained in the packet, the type of information corresponding to at least one of the following categories of content:
    a) sample description;
    b) a fragment of or a complete scene sample;

c) a fragment of or a complete scene update sample;
d) a list of elements that are currently active; or
e) sample dissimilarity information.

15. The non-transitory computer readable medium of claim 14, wherein each scene packet includes priority information for the content contained within the scene packet.

16. The non-transitory computer readable medium of claim 15, wherein each scene packet includes sequence information relative to the priority information for the scene packet.

17. The non-transitory computer readable medium of claim 14, wherein the multimedia presentation includes SVG.

18. The non-transitory computer readable medium of claim 14, wherein the packet stream comprises a plurality of real time transfer protocol packets.

19. The non-transitory computer readable medium of claim 14, further comprising computer code for transmitting embedded static media outside of the packet stream.

20. The non-transitory computer readable medium of claim 19, wherein the embedded static media is transmitted via FLUTE.

21. The non-transitory computer readable medium of claim 19, further comprising computer code for transmitting embedded dynamic media through a plurality of real time transport protocol connections.

22. The non-transitory computer readable medium of claim 14, wherein each scene packet includes a type field indicative of the content of the scene packet.

23. The non-transitory computer readable medium of claim 14, wherein each scene packet includes a marker bit indicative of whether the scene packet contains a final fragment of an SVG sample within the scene packet.

24. The non-transitory computer readable medium of claim 14, wherein each scene packet includes a timestamp indicative of the sampling instant of an SVG sample within the scene packet.

25. The non-transitory computer readable medium of claim 14, wherein each scene packet includes a "number of padding bits field" indicative of the number of padding bits that exist in a final octet of the scene packet's content.

26. The non-transitory computer readable medium of claim 14, wherein each scene packet includes a "sample description index field" indicative of whether the scene packet's content is static or dynamic.

27. An electronic device, comprising:
a processor; and
a memory unit operatively connected to the processor and including computer code for transmitting a signal to a client device, the signal carrying in a packet stream a multimedia presentation specified using a markup language,
wherein the multimedia presentation includes at least one scene description and at least one scene update, and wherein the packet stream includes scene packets, each of which contains information derived from either one of the at least one scene description or one of the at least one scene update,
wherein a header for each packet indicates a type of information contained in the packet, the type of information corresponding to at least one of the following categories of content:
a) sample description;
b) a fragment of or a complete scene sample;
c) a fragment of or a complete scene update sample;
d) a list of elements that are currently active; or
e) sample dissimilarity information.

28. The electronic device of claim 27, wherein each scene packet includes priority information for the content contained within the scene packet.

\* \* \* \* \*